(12) United States Patent
Sano (10) Patent No.: US 6,519,218 B2
(45) Date of Patent: Feb. 11, 2003

(54) RECEIVING APPARATUS AND METHOD OF SAME, RECORDING APPARATUS AND METHOD OF SAME, AND DATA RECORDING SYSTEM

(75) Inventor: Tatsushi Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 09/814,725

(22) Filed: Mar. 23, 2001

(65) Prior Publication Data

US 2002/0001276 A1 Jan. 3, 2002

(30) Foreign Application Priority Data

Mar. 24, 2000 (JP) .......................................... 2000-088499

(51) Int. Cl.[7] ................................................ G11B 7/00
(52) U.S. Cl. ................................ 369/59.19; 369/47.28; 369/47.48
(58) Field of Search ............................ 369/47.1, 47.28, 369/47.48, 53.1, 59.1, 59.19, 59.22

(56) References Cited

U.S. PATENT DOCUMENTS

| | | | | |
|---|---|---|---|---|
| 4,325,090 A | * | 4/1982 | Janak et al. | 360/51 |
| 5,525,935 A | * | 6/1996 | Joo et al. | 360/51 |
| 5,684,841 A | | 11/1997 | Chiba et al. | |

\* cited by examiner

*Primary Examiner*—Muhammad Edun
(74) *Attorney, Agent, or Firm*—Oblon, Spivak, McClelland, Maier & Neustadt, P.C.

(57) ABSTRACT

A receiving apparatus including a receiving circuit for receiving data synchronized with a predetermined clock signal; a data detection circuit, for detecting values of at least three bits of received data in a cycle defined by a period started from a desired position and corresponding to a cycle of the clock signal; and a selecting circuit for selecting from the received data with the detected values the received data with the least change of the value with respect to the received data of values detected immediately before and after substantially in each cycle and outputting the value of the received data.

27 Claims, 7 Drawing Sheets

FIG.2

FIG.4
231 GENERATION CIRCUIT

| N | 1 | 2 | 3 | 4 | 5 | 6 | 7 | 8 | 9 | 10 | 11 |
|---|---|---|---|---|---|---|---|---|---|----|----|
| B(N) | 1 | 1 | 0 | 0 | 0 | 0 | 0 | 0 | 0 | 1 | 1 |
| C(N) | 0 | 1 | 0 | 0 | 0 | 0 | 0 | 0 | 1 | 0 | — |
| D(N) | 0 | 1 | 0 | 0 | 0 | 0 | 0 | 0 | 1 | 0 | — |

RECEIVING APPARATUS AND METHOD OF SAME, RECORDING APPARATUS AND METHOD OF SAME, AND DATA RECORDING SYSTEM

BACKGROUND OF THE INVENTION

1. Field of the Invention

The present invention relates to a receiving apparatus for receiving data and a method of the same, to a recording apparatus for recording input data on a recording medium and a method of the same, and to a data recording system.

2. Description of the Related Art

A plurality of optical disk drives or other recording apparatuses are sometimes connected for transfer of data or a plurality of recording apparatuses are sometimes used for simultaneously recording data. The conventional method in such cases will be explained with reference to FIG. 1.

FIG. 1 is a schematic view of the configuration of an example of a data recording system of the related art.

Figure 1:
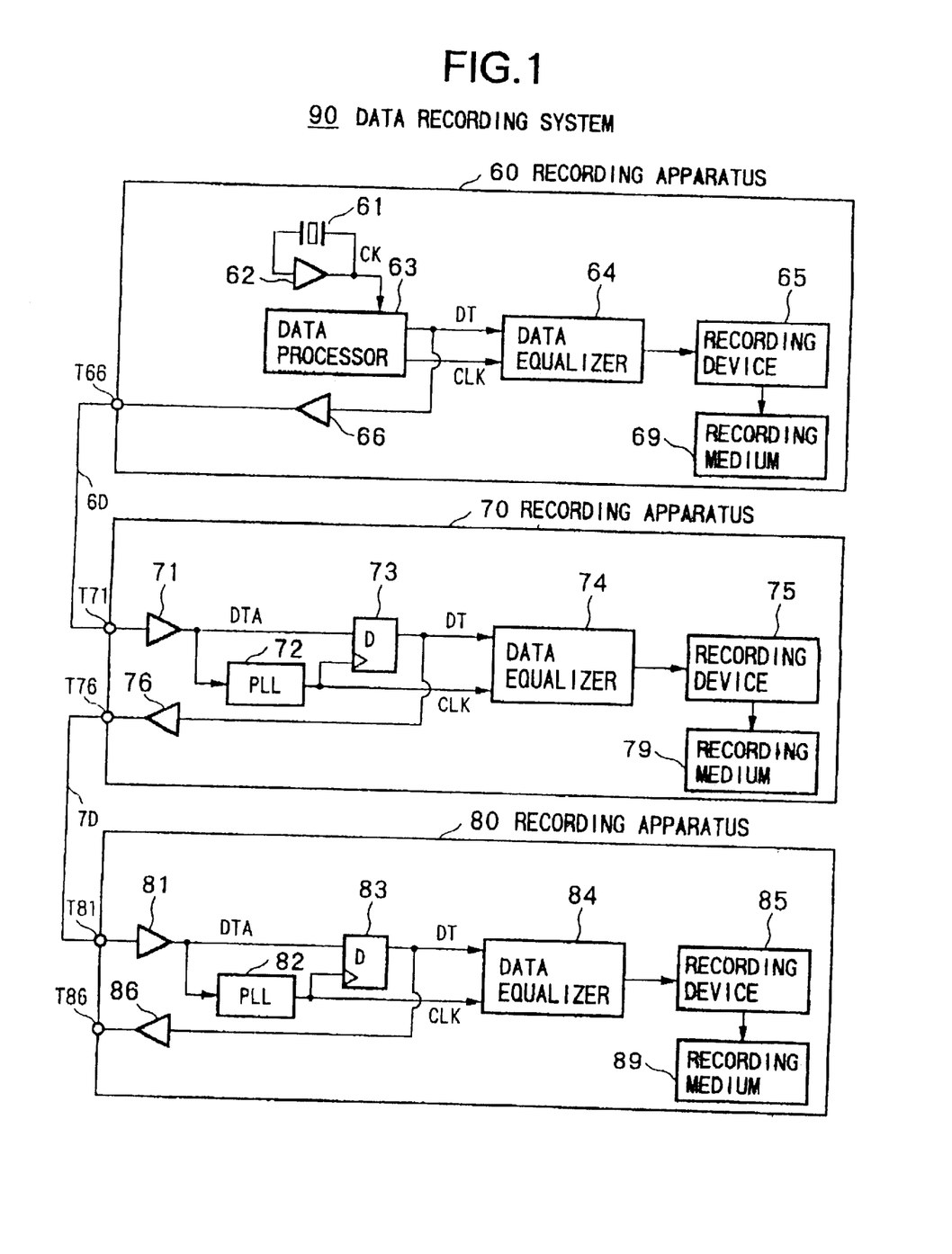
FIG. 1 is a schematic view of the configuration of an example of a data recording system of the related art.

This data recording system 90 comprises recording apparatuses 60 to 80. The recording apparatuses 60 and 70 are connected to each other by a transmission line 6D, while the recording apparatuses 70 and 80 are connected to each other by a transmission line 7D.

The recording apparatuses 70 and 80 reproduce a clock signal CLK from the transmission lines 6D and 7D by phase locked loop (PLL) circuits 72 and 82 and receive data by using the clock signal CLK.

The recording apparatus 60 comprises a crystal oscillator 61, amplifiers 62 and 66, a data processor 63, a data equalizer 64, and a write device 65.

The crystal oscillator 61 and the amplifier 62 comprise a clock signal generation circuit for generating a reference clock signal CK and provide the reference clock signal CK to the data processor 63.

The data processor 63 generates serial data DT and the clock signal CLK based on the reference clock signal CK.

The data equalizer 64 equalizes the serial data DT based on the clock signal CLK and outputs it to the write device 65.

The write device 65 writes the serial data supplied from the data equalizer 64 on the recording medium 69. For example, the write device 65 is an optical disk drive and the recording medium 69 is an optical disk.

The amplifier 66 amplifies the serial data DT from the data processor 63 and outputs it to an output terminal T66.

The output terminal T66 of the recording apparatus 60 and an input terminal T71 of the recording apparatus 70 are connected to each other by the transmission line 6D.

The recording apparatus 70 comprises amplifiers 71 and 76, a PLL circuit 72, a D-type flip-flop (DFF) 73, a data equalizer 74, and a write device 75.

The amplifier 71 amplifies serial data from the input terminal T71 to generate serial data DTA and supplies the serial data DTA to the PLL circuit 72 and a data input terminal of the DFF 73.

The PLL circuit 72 generates a clock signal CLK based on the serial data DTA and supplies the clock signal CLK to a clock input terminal of the DFF 73 and the data equalizer 74.

The DFF 73 latches the serial data DTA based on the clock signal CLK and supplies the latched data to the data equalizer 74 as serial data DT.

The data equalizer 74 equalizes the serial data DT based on the clock signal CLK and outputs it to the write device 75.

The write device 75 writes the serial data supplied from the data equalizer 74 on the recording medium 79. For example, the write device 75 is an optical disk drive and the recording medium 79 is an optical disk.

The amplifier 76 amplifies the serial data DT from the DFF 73 and outputs it to an output terminal T76.

The output terminal T76 of the recording apparatus 70 and an input terminal T81 of the recording apparatus 80 are connected to each other by the transmission line 7D.

The recording apparatus 80 comprises amplifiers 81 and 86, a PLL circuit 82, a D-type flip-flop (DFF) 83, a data equalizer 84, and a write device 85.

The write device 85 of the recording apparatus 80 writes data on a recording medium 89. For example, the write device 85 is an optical disk drive and the recording medium 99 is an optical disk.

The amplifiers 81 and 86, the PLL circuit 82, the D-type flip-flop (DFF) 83, the data equalizer 84, and the write device 85 of the recording apparatus 80 have the same configurations as the amplifiers 71 and 76, the PLL circuit 72, the D-type flip-flop (DFF) 73, the data equalizer 74, and the write device 75, so the explanations of these portions having the same configurations are omitted.

Summarizing the problem to be solved by the invention, in the recording apparatus 70, the output data DT from the DFF 73 is influenced by the jitter of the clock signal CLK generated in the PLL circuit 72.

In the recording apparatus 80, the output data DT from the DFF 83 is influenced by the jitter of the clock signal CLK generated in the PLL circuit 72 and the jitter of the clock signal CLK generated in the PLL circuit 82.

Therefore, when further recording apparatuses are connected to an output terminal T86 of the recording apparatus 80, it becomes difficult to accurately record the data DT generated at the data processor 63 on all recording media because of the accumulation of the jitter.

On the other hand, there is a synchronized receiving method in which both of the clock signal and the serial data are supplied to the receiving apparatus to prevent the jitter of the clock signal caused by the PLL circuit.

In this synchronized receiving method of the related art, however, the clock signal and the data must be accurately synchronized under a predetermined phase relationship. In practice, however, the phase of the data actually input from the outside is often off from the clock signal. Further, the amount of the deviation is not apparent. Therefore, such a synchronized method cannot be applied in the many cases.

SUMMARY OF THE INVENTION

An object of the present invention is to provide a receiving apparatus and method able to suitably receive data even if the phase of the data and the phase of the clock signal are offset.

Another object of the present invention is to provide a recording apparatus and method able to suitably record input data on a recording medium even if the phase of the input data and the phase of the clock signal are offset.

Still another object of the present invention is to provide a data recording system able to suitably record input data on a recording medium even if the phase of the input data and the phase of the clock signal are offset.

According to a first aspect of the present invention, there is provided a receiving apparatus comprising a receiving circuit for receiving data synchronized with a predetermined clock signal; a data detection circuit for detecting values of at least three bits of received data in a cycle defined by a period started from a desired position and corresponding to a cycle of the clock signal; and a selecting circuit for selecting from the received data with the detected values the received data with the least change of the value with respect to the received data of values detected immediately before and after substantially in each cycle and outputting the value of the received data.

Preferably, the selecting circuit detects the longest period when the same value continues based on the detected values of the plurality of bits of received data and selects the received data of the approximate center of the period.

More preferably, the data detection circuit detects the values of the plurality of bits of received data in synchronization with the clock signal at every predetermined interval less than ½ of the cycle of the clock signal.

Still more preferably, the data detection circuit successively delays the received data to generate M (M is an integer of 4 or more) number of bits of delayed data and latches the M number of bits of delayed data in synchronization with the clock signal substantially simultaneously to detect the values of the M number of bits of the received data, and the selecting circuit selects from the M number of the received data with values detected and successively delayed the received data of the approximate center of a range where the values are the same and outputs the latched data of the selected received data.

Specifically, the data detection circuit comprises a comparison circuit for comparing values of adjacent data in the order of delay from the detected values of M number of bits of the received data, the receiving apparatus further comprises a center data detection circuit for detecting, based on the results of comparison, a range of delay times where the values of the received data are the same or a range of delayed received data corresponding to the range of delay times and detecting the delay time of the approximate center of the range of delay times or the range of the received data, and the selecting circuit outputs from the M number of bits of successively delayed received data the latched data corresponding to the detected approximate center delay time or approximate center received data.

More specifically, the data detection circuit comprises M number of delay circuits for successively delaying the received data to generate the M number of bits of delayed data and a first latch circuit for latching the M number of bits of delayed data based on the clock signal to generate the M number of bits of latched data, and the comparison circuit compares the adjacent latched data in the order of delay of the corresponding delayed data for the M number of bits of latched data generated in the first latching circuit.

Still more specifically, the data detection circuit further comprises a second latch circuit for latching the output data of the comparison circuit based on the clock signal, and the center data detection circuit detects the center delay time or the center received data based on the output data of the second latch circuit.

Still more specifically again, the data detection circuit further comprises a delay circuit for delaying the clock signal to be supplied to the first latch circuit and supplying it to the second latch circuit and having a longer delay time than the total of the delay time of the first latch circuit and the delay time of the comparison circuit.

Here, each of the delay times of the M number of delay circuits is not more than ⅓ of the cycle of the clock signal, and the total of the delay times of the M number of delay circuits is at least equal to the cycle of the clock signal and not more than or substantially not more than 2 times the cycle of the clock signal.

According to a second aspect of the present invention, there is provided a receiving method, comprising receiving data synchronized with a predetermined clock signal; detecting from the received data values of at least three bits of received data in a cycle defined by a period started from a desired position and corresponding to a cycle of the clock signal; selecting from the received data with the detected values the received data with the least change of the value with respect to the received data of values detected immediately before and after substantially in each cycle; and outputting the value of the received data.

According to a third aspect of the present invention, there is provided a recording apparatus, comprising an input circuit for receiving as input data generated synchronized with a predetermined clock signal; a data detection circuit for detecting values of at least three bits of input data in a cycle defined by a period started from a desired position and corresponding to a cycle of the clock signal; a selecting circuit for selecting from the input data with the detected values the input data with the least change of the value with respect to the input data of values detected immediately before and after substantially in each cycle; and a write circuit for writing the selected input data on a recording medium.

Preferably, the recording apparatus further comprises a first input terminal for receiving as input the data, a first amplifier for amplifying and outputting the latched data selected by the selecting circuit, a first output terminal for receiving as input the latched data output from the first amplifier, a second input terminal for receiving the clock signal, a second amplifier for amplifying and outputting the clock signal, and a second output terminal for receiving the clock signal output from the second amplifier.

More preferably, the recording apparatus further comprises an equalizer for equalizing and outputting the latched data selected by the selecting circuit, wherein the write circuit writes the latched data output from the equalizer on the recording medium.

According to a fourth aspect of the present invention, there is provided a recording method comprising receiving as input data generated synchronized with a predetermined clock signal; detecting, for the input data, values of at least three bits of input data in a cycle defined by a period started from a desired position and corresponding to a cycle of the clock signal; selecting from the input data with the detected values the input data with the least change of the value with respect to the input data of values detected immediately before and after substantially in each cycle; and recording the selected input data on a recording medium.

According to a fifth aspect of the present invention, there is provided a data recording system, having a data processing apparatus and a plurality of recording apparatuses, wherein said data processing apparatus comprises; an oscillator for generating a clock signal, a data processing circuit for generating the serial data synchronized with said clock signal, and a transmitting circuit for transmitting said clock signal and said serial data, and each of said recording apparatuses comprises; an receiving circuit for receiving said clock signal and said serial data, a data detection circuit for detecting values of at least three bits of the serial data in a cycle defined by a period started from a desired position and corresponding to a cycle of said clock signal, a selecting circuit for selecting from the serial data with the detected values the serial data with the least change of the value with respect to the serial data of values detected immediately before and after substantially in each cycle, and a write circuit for writing said selected serial data on a recording medium.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Next, preferred embodiments will be described with reference to the accompanying drawings.

Figure 2:
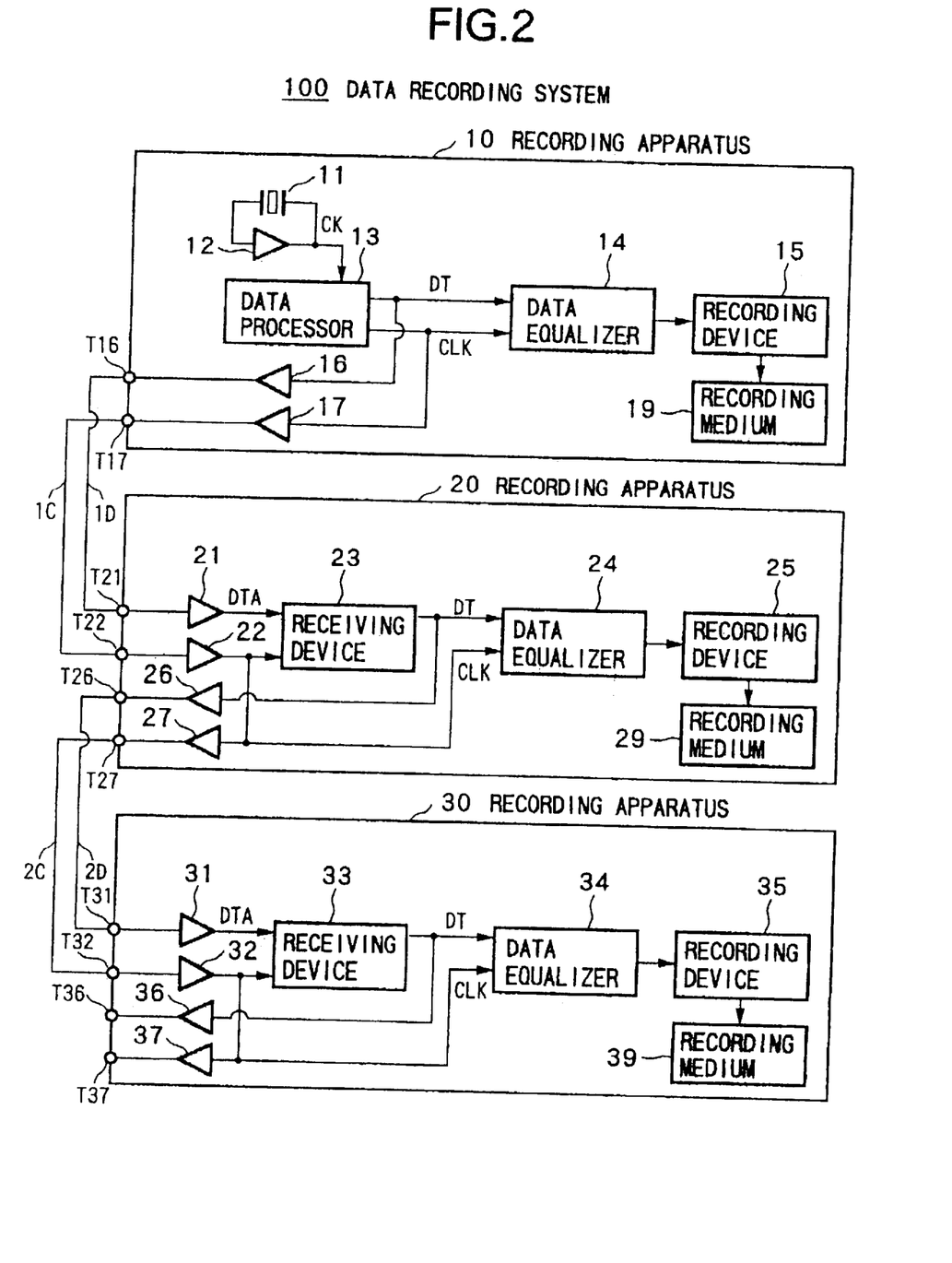
FIG. 2 is a schematic view of the configuration of a data recording system comprising a receiving apparatus according to an embodiment of the present invention.

FIG. 2 is a schematic view of the configuration of a data recording system including a receiving apparatus according to an embodiment of the present invention.

This data recording system 100 comprises recording apparatuses 10 to 30. The recording apparatuses 10 and 20 are connected to each other by transmission lines 1C and 1D, while the recording apparatuses 20 and 30 are connected to each other by transmission lines 2C and 2D.

Recording apparatus 10

The recording apparatus 10 comprises a crystal oscillator 11, amplifiers 12, 16, and 17, a data processor 13, a data equalizer 14, and a write device 15.

The crystal oscillator 11 and the amplifier 12 comprise a clock signal generation circuit for generating a reference clock signal CK and supply the reference clock signal CK to the data processor 13.

The data processor 13 generates serial data DT and a clock signal CLK based on the reference clock signal CK.

The data equalizer 14 equalizes the serial data DT based on the clock signal CLK and outputs it to the write device 15.

The write device 15 writes the serial data provided from the data equalizer 14 on the recording medium 19. For example, the write device 15 is an optical disk drive and the recording medium 19 is an optical disk.

The amplifier 16 amplifies the serial data DT from the data processor 13 and outputs it to an output terminal T16.

The output terminal T16 of the recording apparatus 10 and an input terminal T21 of the recording apparatus 20 are connected to each other by the transmission line 1D.

The amplifier 17 amplifies the clock signal CLK from the data processor 13 and outputs it to an output terminal T17.

The output terminal T17 of the recording apparatus 10 and an input terminal T22 of the recording apparatus 20 are connected to each other by the transmission line 1C.

Recording apparatus 20

The recording apparatus 20 comprises amplifiers 21, 22, 26, and 27, a receiving device 23, a data equalizer 24, and a write device 25.

The amplifier 21 amplifies the serial data from the first input terminal T21 to generate the serial data DTA and supplies the serial data DTA to the receiving device 23.

The amplifier 22 amplifies the clock signal CLK from the second input terminal T22 and supplies it to the receiving device 23.

The receiving device 23 reproduces the serial data DT generated by the data processor 13 based on the serial data DTA from the amplifier 21 and the clock signal CLK from the amplifier 22 and supplies the serial data DT to the data equalizer 24.

The data equalizer 24 equalizes the serial data DT from the receiving device 23 using the clock signal CLK from the amplifier 22 and outputs the equalized serial data DT to the write device 25.

The write device 25 records the serial data provided from the data equalizer 24 on the recording medium 29. For example, the write device 25 is an optical disk drive and the recording medium 29 is an optical disk.

The first amplifier 26 amplifies the serial data DT from the receiving device 23 and outputs it to the first output terminal T26.

The first output terminal T26 of the recording apparatus 20 and the first input terminal T31 of the recording apparatus 30 are connected to each other by the transmission line 2D.

The second amplifier 27 amplifies the clock signal CLK from the amplifier 22 and outputs it to the second output terminal T27.

The second output terminal 27 of the recording apparatus 20 and the second input terminal T32 of the recording apparatus 30 are connected to each other by the transmission line 2C.

Recording apparatus 30

The recording apparatus 30 comprises amplifiers 31, 32, 36, and 37, a receiving device 33, a data equalizer 34, and a write device 35.

The write device 35 of the recording apparatus 30 records the data on a recording medium 39. For example, the write device 35 is an optical disk drive and the recording medium 99 is an optical disk.

The amplifiers 31, 32, 36, and 37, the receiving device 33, the data equalizer 34, and the write device 35 have the same configurations as the amplifiers 21, 22, 26, and 27, the receiving device 23, the data equalizer 24, and the write device 25, so explanations of these portions having the same configuration are omitted.

Receiving device 23

Figure 3:
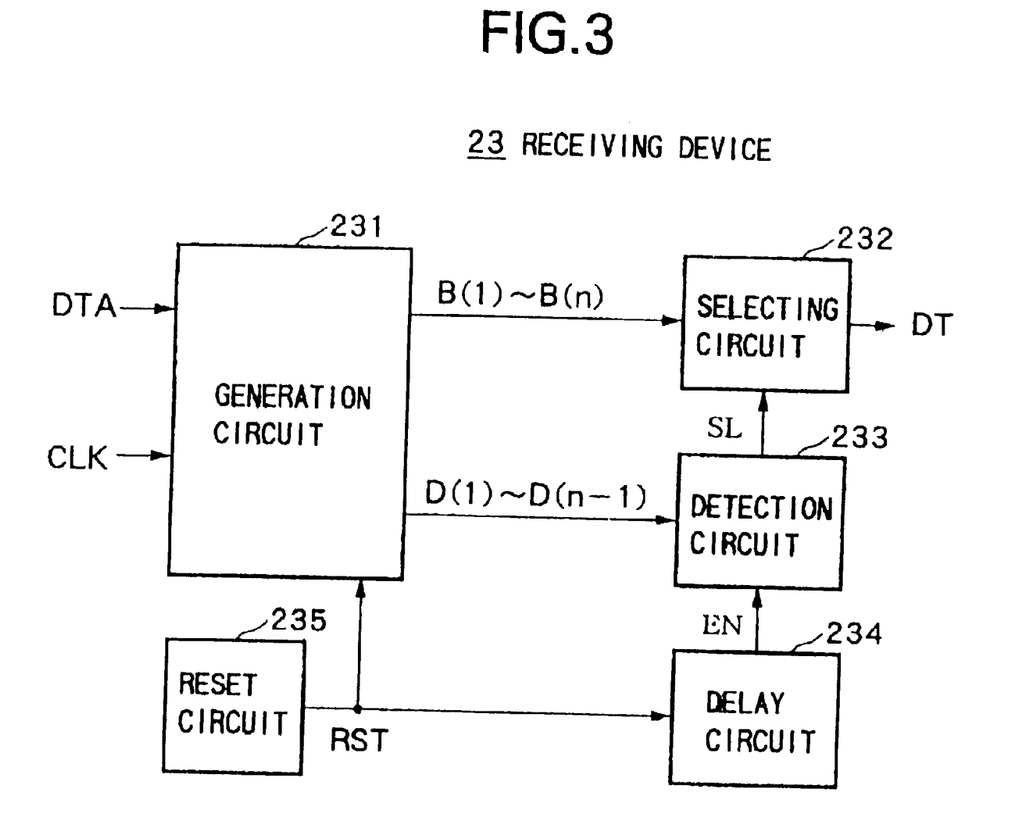
FIG. 3 is a schematic view of the configuration of the receiving apparatus shown in FIG. 2.

FIG. 3 is a schematic block diagram of the configuration of the receiving device 23 of the recording apparatus 20 shown in FIG. 1.

This receiving device 23 comprises a generation circuit 231, a selecting circuit 232, a detection circuit 233, a delay circuit 234, and a reset circuit 235.

The generation circuit 231 receives the serial data DTA and the clock signal CLK and generates latch data B(1) to B(n) and comparison data D(1) to D(n−1).

The latch data B(1) to B(n) are data obtained by latching the delay data, generated by successively delaying the serial data DTA by predetermined time intervals, by the clock signal CLK at the same time or substantially at the same time.

The comparison data D(1) to D(n−1) are data indicating the results of the comparison of two adjacent latch data in the latch data B(1) to B(n).

The detection circuit 233 detects the most suitable delay time for reception of data from the delay times of the latch data B(1) to B(n) from the latch data B(1) to B(n), or a value corresponding to the delay time, based on the comparison data D(1) to D(n−1) and generates a setting signal SL indicating the detected delay time or value.

The selecting circuit 232 selects the latch data which is latched at the delay time corresponding to the delay time or a delay time corresponding to the above value detected by the detection circuit 233 from the latch data B(1) to B(n) and outputs it as the data DT.

The reset circuit 235 generates the reset signal RST and supplies it to the generation circuit 231 and the delay circuit 234.

The generation circuit 231 is reset by the reset signal RST. It is preferable that the reset are carried out right before the time when new serial data is supplied to the generation circuit 231.

The delay circuit 234 delays the reset signal RST by a predetermined delay time Td to generate an enable signal EN. This delay time Td is enough time for generating the latch data B(1) to B(n) and/or the comparison data D(1) to D(n−1) from the serial data DTA in the generation circuit 231. This delay circuit 234 may be configured for example by a delay circuit having a resistor R and capacitor C using the time constant of charging and discharging.

The detection circuit 233 starts the operation for detection of the most suitable delay time for reception of data or a value corresponding to the delay time based on the enable signal EN.

Figure 4:
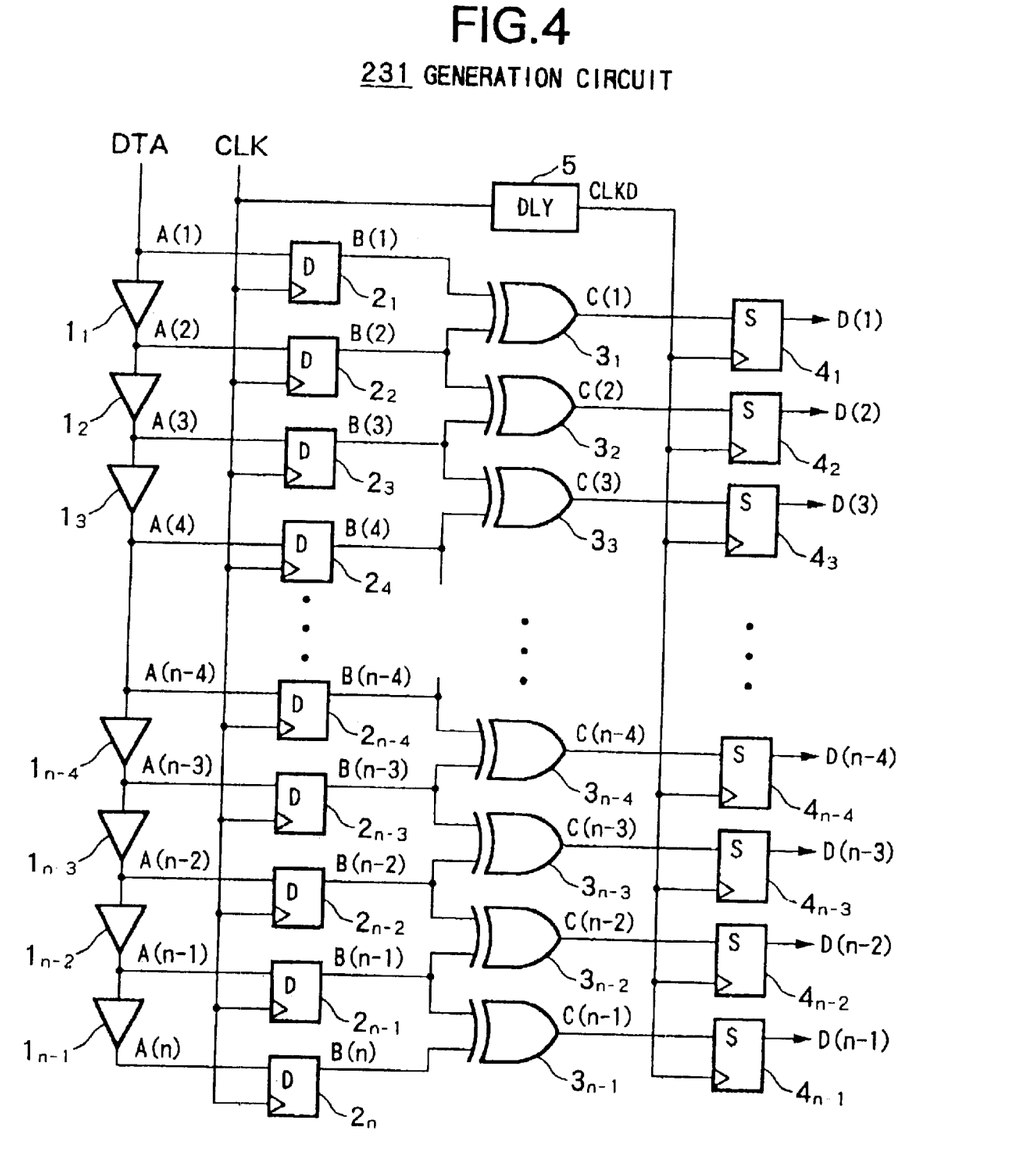
FIG. 4 is a schematic view of the configuration of an example of a generation circuit shown in FIG. 3.

FIG. 4 is a schematic view of the configuration of an example of the generation circuit 231 shown in FIG. 3.

This generation circuit 231 comprises delay circuits $1_1$ to $1_{n-1}$, first latch circuits $2_1$ to $2_n$, comparison circuits $3_1$ to $3_{n-1}$, second latch circuits $4_1$ to $4_{n-1}$, and a delay circuit 5. n is an integer of 5 or more, for example n is 11.

For example, each of the first latch circuits $2_1$ to $2_n$ is configured by a D-type flip-flop (DFF), and each of the second latch circuits $4_1$ to $4_{n-1}$ is configured by an RS-type flip-flop (RSFF).

The delay circuits $1_1$ to $1_{n-1}$ are connected in series and successively delay the serial data DTA input to the delay circuit $1_1$ to generate the delay data A(2) to A(n). For example, each of the delay circuits $1_1$ to $1_{n-1}$ is configured by a buffer.

The delay data A(2) to A(n) output from the delay circuits $1_1$ to $1_{n-1}$ are supplied to the data input terminals of the second latch circuits $2_2$ to $2_n$. Further, the input data A(1) of the delay circuit $1_1$ is supplied to the data input terminal of the second latch circuit $2_1$. By this, the generation circuit 231 generates parallel data including the delay data A(2) to A(n) (or the delay data A(1) to A(n)).

Further, the numbers in parentheses of the delay data A(1) to A(n) correspond to the order of the magnitude of the delay time.

Each delay time of the delay circuits $1_1$ to $1_{n-1}$ is a positive value not more than ⅓ of the cycle time of the clock signal CLK.

The total value of the delay times of the delay circuits $1_1$ to $1_{n-1}$ is not less than the cycle time of the clock signal CLK and not more than or approximately not more than 2 times the cycle time.

Further, the total value is preferably equal or approximately equal to the delay time Td of the delay circuit 234.

The first latch circuits $2_1$ to $2_n$ receive the clock signal CLK at their clock input terminals and latch the delay data A(1) to A(n) in response to the clock signal CLK (for example, at the trailing edge of the clock signal CLK) to generate the latch data B(1) to B(n).

Further, the first latch circuits $2_1$ to $2_n$ are reset by the reset signal RST from the reset circuit 235.

The comparison circuits $3_1$ to $3_{n-1}$ compare the two adjacent latch data in the latch data B(1) to B(n) to generate the comparison data C(1) to C(n−1).

The comparison circuits $3_1$ to $3_{n-1}$ are configured by exclusive or elements (EOR elements). In this case, each of the comparison circuits $3_1$ to $3_{n-1}$ outputs the logical value 0 when the adjacent latch data match, while outputs the logical value 1 when the adjacent latch data do not match.

The second latch circuits $4_1$ to $4_{n-1}$ receive the comparison data C(1) to C(n−1) at their setting input terminals and receive the clock signal CLKD at their clock input terminals.

The second latch circuits $4_1$ to $4_{n-1}$ latch the comparison data C(1) to C(n−1) in response to the clock signal CLKD to output the latch data as the comparison data C(1) to C(n−1).

The second latch circuits $4_1$ to $4_{n-1}$ are configured for example by RS flip-flops (RSFFs). Further, the second latch circuits $4_1$ to $4_{n-1}$ are reset by the reset signal RST from the reset circuit 235.

The second latch circuits $4_1$ to $4_{n-1}$ receive the clock signal CLKD generated by delaying the clock signal CLK supplied to the first latch circuits $2_1$ to $2_{n-1}$ by the predetermined time Ta in the delay circuit 5, for timing adjustment. The predetermined time Ta is larger than the sum obtained by adding the delay time of the first latch circuit $2_1$ and the delay time of the comparison circuit $3_1$.

Figure 5:
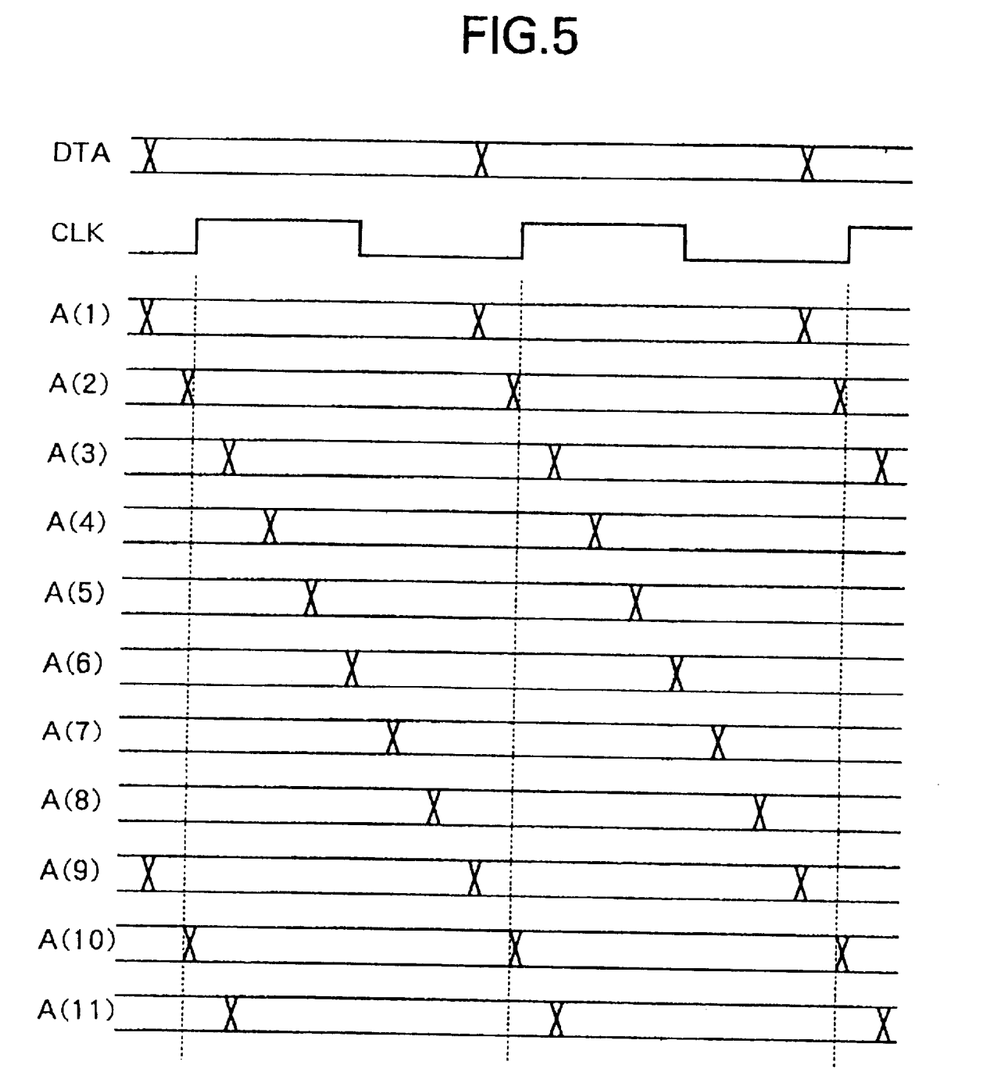
FIG. 5 is a schematic time chart for explaining an operation of the generation circuit shown in FIG. 4.

FIG. 5 is a schematic time chart for explaining the operation of the generation circuit 231 shown in FIG. 4.

The generation circuit 231 receives the serial data DTA and the clock signal CLK.

The delay circuits $1_1$ to $1_{n-1}$ in the generation circuit 231 successively delay the serial data DTA to generate the delay data A(2) to A(n) and supply them to the first latch circuits $2_1$ to $2_{n-1}$. Further, in the example shown in FIG. 5, n equal 11.

Figure 6:
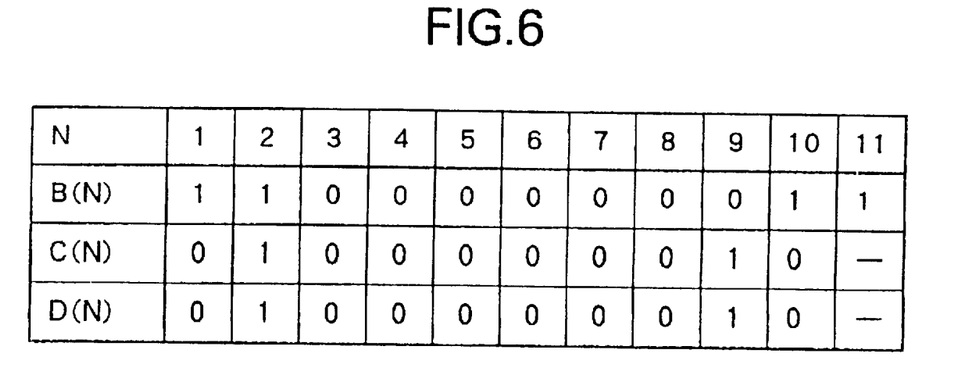
FIG. 6 is a view for explaining examples of logical values of various data in the generation circuit shown in FIG. 4.

FIG. 6 is a view for explaining examples of logical values of various data in the generation circuit 213 shown in FIG. 4. In FIG. 6, N is a natural number, where 1≦N≦n, corresponds to the order of the delay of the delay data. Further, the value of (N−1) corresponds to the delay time of the delay data A(N).

When N=1, 2, 10, and 11, the latch data B(N)=1.

When N=3 to 9, the latch data B(N)=0.

When N=2 and 9, the comparison data C(N) and D(N)=1.

When N=1, 3 to 8, and 10, the comparison data C(N) and D(N)=0.

In FIG. 6, the latch data B(N) changes between N=2 and N=3, Further, the latch data B(N) changes between N=9 and N=10.

Therefore, it is desirable for the selecting circuit 232 shown in FIG. 2 to select the latch data B(N) at N=5 to 7, and more desirable to select the latch data B(6).

Namely, it is desirable for the detection circuit 233 to generate a setting signal SL indicating N=5 to 7, and more desirable to generate a setting signal SL indicating N=6.

The selecting circuit 232 can select the latch data latched at the center or approximate center of the period when the delay data are constant in response to the setting signal SL, and the receiving device 23 is able to receive the serial data DT securely.

Figure 7:
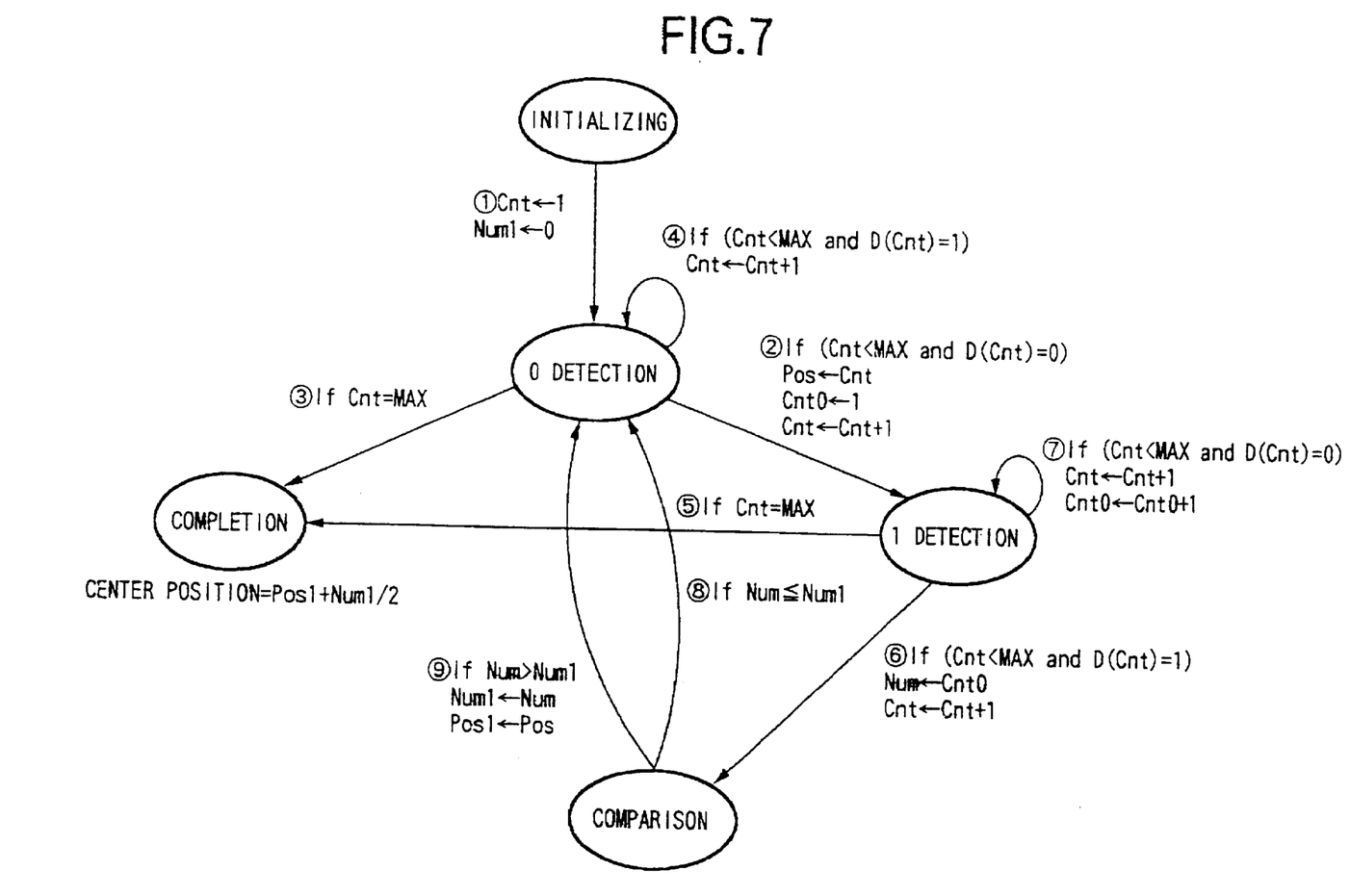
FIG. 7 is a schematic view for explaining transitions in state in the operation of the generation circuit shown in FIG. 3.

FIG. 7 is a schematic view of a transition in state for explaining the operation of the detection circuit 233 shown in FIG. 3. This detection circuit 233 is configured for example by a microcomputer.

The detection circuit 233 enters the "initializing" state in response to the enable signal EN.

The detection circuit 233 sets a variable Cnt=1 and a variable Num1=0 in the "initializing" state and changes to the "0 detection" state.

When the variable Cnt is not MAX and the comparison data D(Cnt) is 0 in the "0 detection" state, the detection circuit 233 sets a variable Pos to Cnt and a variable Cnt0 to 1, counts up the variable Cnt by 1, and changes to the "1 detection" state. The variable Cnt0 corresponds to the number of the logical values 0 of the comparison data. The variable Pos corresponds to the detection position of the logical value 0.

When the variable Cnt is MAX in the "0 detection" state, the detection circuit 233 changes to the "completion" state. Further, MAX is n.

When the comparison data D(Cnt) is not≠0 and the variable Cnt is not MAX in the "0 detection" state, the detection circuit 233 increases the variable Cnt by 1.

When the variable Cnt is MAX in the "1 detection" state, the detection circuit 233 changes to the "completion" state. Further, MAX is n.

When the variable Cnt is not MAX and the comparison data D(Cnt) is 1 in the "1 detection" state, the detection circuit 233 sets a variable Num to Cnt0, counts up the variable Cnt by 1, and changes to the "comparison" state. The variable Num temporarily records the number of the logical values 0 of the comparison data D(Cnt) until the comparison data D(Cnt) becomes the logical value 1.

When the comparison data D(Cnt) is not 1 and the variable Cnt is not MAX in the "1 detection" state, the detection circuit 233 increases the variable Cnt by 1 and increases the variable Cnt0 by 1.

When the variable Num≦Num1 in the "comparison" state, the detection circuit 233 changes to the "0 detection" state.

When the variable Num>Num1 in the "comparison" state, the detection circuit 233 sets the variable Num1 to Num, sets the variable Pos1 to Pos, and changes to the "0 detection" state.

Here, if the variable Num indicating the number of the logical values 0 is the largest so far, the detection circuit 233 sets the value of the variable Num in the variable Num1 and sets the position (the order) where the logical value 0 starts in the variable Pos1.

In the "completion" state, the detection circuit 233 calculates Pos1+(Num1)/2 and detects the order (the center position) corresponding to the delay time latched at the center or approximate center of the period where the delay time are constant from the delay time of the delay data A(1) to A(n).

For example, when the variable Pos1 is 3 and the variable Num1 is 6 in the "completion" state, the center position is 6 (=3+6/2). In this case, the detection circuit 233 detects that the delay time of the delay data A(6) is the most suitable delay time for reception of data.

Then, the detection circuit 233 outputs the setting signal SL indicating the detected center position (N=6) to the selecting circuit 232.

The receiving device 23 described above is able to receive the data DT securely based on the clock signal CLK and the data DT synchronized to the clock signal CLK without restricting the relationship of the phases between the clock signal CLK and the data DT.

For example, when a plurality of receiving apparatuses are connected, no strict restriction is necessary on the relationship of the phases of the clock signal and the serial data between the receiving apparatuses, so any serial data can be transmitted at a high speed independent of the length of the transmission line and the delay time of an integrated circuit (IC) in the receiving apparatus.

Further, a configuration without the PLL circuit for the transfer of the serial data may be realized. As a result, the accumulation of jitter generated in the PLL circuits in the transferred data may be prevented.

Further, in the data recording apparatus 20 according to the present invention, the operation mentioned above is preferably applied to data which changes in value with every clock. In other words, it is preferable to select and output the data of the delay time detected before when the value of the data does not change for 2 cycles or more and to perform processing for determining the delay time only when data believed to be changing every cycle and therefore suitable for processing is input.

Further, the processing for measuring the delay time may be carried out every cycle and may be carried out selectively in a specific time period. In this case, the delay time selected in a specific time period may be selected and used in another time period.

The reset signal from the reset circuit 235, the enable signal from the delay circuit 234, and so on may be suitably generated in accordance with the type of such processing.

Note the receiving device 23 may be provided in a plurality of integrated circuits (ICs) for transfer of serial data among the plurality of ICs.

Further, the receiving device 23 may be provided on a plurality of printed circuit boards for transfer of serial data among the plurality of printed circuit boards.

Further, a plurality of receiving devices 23 may be provided in an integrated circuit (IC) for transfer of serial data among the plurality of receiving devices 23 in the IC.

Summarizing the effects of the invention, as described above, according to the present invention, a receiving apparatus and method able to suitably receive data even when the phase of the clock signal and the phase of the data are offset can be provided.

Further, a recording apparatus and method able to suitably record input data on a recording medium even when the phase of the input data and the phase of the clock signal are offset can be provided.

While the invention has been described with reference to specific embodiment chosen for purpose of illustration, it should be apparent that numerous modifications could be made thereto by those skilled in the art without departing from the basic concept and scope of the invention.

The present disclosure relates to subject matter contained in Japanese Patent Application No. 2000-88499, filed on Mar. 24, 2000, the disclosure of which is expressly incorporated herein by reference in its entirety.

What is claimed is:

1. A receiving apparatus comprising:
   a receiving circuit for receiving data synchronized with a predetermined clock signal;
   a data detection circuit for detecting values of at least three bits of received data in a cycle defined by a period started from a desired position and corresponding to a cycle of said clock signal; and
   a selecting circuit for detecting the longest period when the same value continues based on the detected values of the plurality of bits of received data, selecting the received data of the approximate center of the period, and outputting the value of the received data.

2. A receiving apparatus as set forth in claim 1, wherein said data detection circuit detects the values of the plurality of bits of received data in synchronization with the clock signal at every predetermined interval less than ½ of the cycle of the clock signal.

3. A receiving apparatus as set forth in claim 2, wherein
   said data detection circuit successively delays said received data to generate M (M is an integer of 4 or more) number of bits of delayed data and latches said M number of bits of delayed data in synchronization with said clock signal substantially simultaneously to detect the values of the M number of bits of said received data, and
   said selecting circuit selects from the M number of the received data with values detected and successively delayed the received data of the approximate center of a range where the values are the same and outputs said latched data of said selected received data.

4. A receiving apparatus as set forth in claim 1, wherein
   said data detection circuit comprises a comparison circuit for comparing values of adjacent data in the order of delay from said detected values of M number of bits of the received data,
   the receiving apparatus further comprises a center data detection circuit for detecting, based on the results of comparison, a range of delay times where the values of the received data are the same or a range of delayed received data corresponding to said range of delay times and detecting the delay time of the approximate center of said range of delay times or the range of said received data, and
   said selecting circuit outputs from the M number of bits of successively delayed received data said latched data corresponding to said detected approximate center delay time or approximate center received data.

5. A receiving apparatus as set forth in claim 4, wherein
   said data detection circuit comprises;
      M number of delay circuits for successively delaying said received data to generate said M number of bits of delayed data and
      a first latch circuit for latching said M number of bits of delayed data based on said clock signal to generate said M number of bits of latched data, and
   said comparison circuit compares the adjacent latched data in the order of delay of the corresponding delayed data for said M number of bits of latched data generated in said first latching circuit.

6. A receiving apparatus as set forth in claim 5, wherein
   said data detection circuit further comprises a second latch circuit for latching the output data of said comparison circuit based on said clock signal, and
   said center data detection circuit detects said center delay time or said center received data based on the output data of said second latch circuit.

7. A receiving apparatus as set forth in claim 6, wherein said data detection circuit further comprises a delay circuit for delaying said clock signal to be supplied to said first latch circuit and supplying it to said second latch circuit and having a longer delay time than the total of the delay time of said first latch circuit and the delay time of said comparison circuit.

8. A receiving apparatus as set forth in claim 7, wherein
   each of the delay times of said M number of delay circuits is not more than ⅓ of the cycle of said clock signal, and
   the total of the delay times of said M number of delay circuits is at least equal to the cycle of the clock signal and not more than or substantially not more than 2 times the cycle of the clock signal.

9. A receiving method, comprising:
   receiving data synchronized with a predetermined clock signal;
   detecting from said received data values of at least three bits of received data in a cycle defined by a period started from a desired position and corresponding to a cycle of said clock signal;
   detecting the longest period when the same value continues based on the detected values of the plurality of bits of received data, and
   selecting the received data of the approximate center of the period.

10. A receiving method as set forth in claim 9, wherein said step of detection of received data detects the values of the plurality of bits of received data in synchronization with the clock signal at every predetermined interval less than ½ of the cycle of the clock signal.

11. A receiving method as set forth in claim 10, wherein
    said step of detection of received data successively delays said received data to generate M (M is an integer of 4 or more) number of bits of delayed data and latches said M number of bits of delayed data in synchronization with said clock signal substantially simultaneously to detect the values of the M number of bits of said received data;
    said step of selection of received data selects from the M number of the received data with values detected and successively delayed the received data of the approximate center of a range where the values are the same; and
    said step of output of data outputs said latched data of said selected received data.

12. A recording apparatus, comprising:
    an input circuit for receiving as input data generated synchronized with a predetermined clock signal;
    a data detection circuit for detecting values of at least three bits of input data in a cycle defined by a period started from a desired position and corresponding to a cycle of said clock signal;
    a selecting circuit for selecting from the input data with the detected values the input data with the least change of the value with respect to the input data of values detected immediately before and after substantially in each cycle; and
    a write circuit for writing said selected input data on a recording medium.

13. A recording apparatus as set forth in claim 12, wherein said selecting circuit detects the longest period when the same value continues from the detected values of the input data and selects the input data of the approximate center in the period.

14. A recording apparatus as set forth in claim 13, wherein said data detection circuit detects the values of the plurality of bits of input data in synchronization with the clock signal at every predetermined interval less than ½ of the cycle of the clock signal.

15. A recording apparatus as set forth in claim 14, wherein
said data detection circuit successively delays said input data to generate M (M is an integer of 4 or more) number of bits of delayed data and latches said M number of bits of delayed data in synchronization with said clock signal substantially simultaneously to detect the values of the M number of bits of said input data, and said selecting circuit selects from the M number of the input data with values detected and successively delayed the input data of the approximate center of a range where the values are the same and outputs said latched data of said selected input data.

16. A recording apparatus as set forth in claim 15, wherein
said data detection circuit comprises a comparison circuit for comparing values of adjacent data in the order of delay from said detected values of M number of bits of the input data, the recording apparatus further comprises a center data detection circuit for detecting, based on the results of comparison, a range of delay times where the values of the input data are the same or a range of delayed input data corresponding to said range of delay times and detecting the delay time of the approximate center of said range of delay times or the range of said input data, and said selecting circuit outputs from the M number of bits of successively delayed input data said latched data corresponding to said detected approximate center delay time or approximate center input data.

17. A recording apparatus as set forth in claim 16, wherein said data detection circuit comprises;
M number of delay circuits for successively delaying said input data to generate said M number of bits of delayed data and
a first latch circuit for latching said M number of bits of delayed data based on said clock signal to generate said M number of bits of latched data, and
said comparison circuit compares the adjacent latched data in the order of delay of the corresponding delayed data for said M number of bits of latched data generated in said first latching circuit.

18. A recording apparatus as set forth in claim 17, wherein
said data detection circuit further comprises a second latch circuit for latching the output data of said comparison circuit based on said clock signal, and
said center data detection circuit detects said center delay time or said center input data based on the output data of said second latch circuit.

19. A recording apparatus as set forth in claim 18, wherein said data detection circuit further comprises a delay circuit for delaying said clock signal to be supplied to said first latch circuit and supplying it to said second latch circuit and having a longer delay time than the total of the delay time of said first latch circuit and the delay time of said comparison circuit.

20. A recording apparatus as set forth in claim 19, wherein
each of the delay times of said M number of delay circuits is not more than ⅓ of the cycle of said clock signal, and
the total of the delay times of said M number of delay circuits is at least equal to the cycle of the clock signal and not more than or substantially not more than 2 times the cycle of the clock signal.

21. A recording apparatus as set forth in claim 20, further comprising:
a first input terminal for receiving as input said data,
a first amplifier for amplifying and outputting the latched data selected by said selecting circuit,
a first output terminal for receiving as input said latched data output from said first amplifier,
a second input terminal for receiving said clock signal,
a second amplifier for amplifying and outputting the clock signal, and
a second output terminal for receiving said clock signal output from said second amplifier.

22. A recording apparatus as set forth in claim 21, further comprising an equalizer for equalizing and outputting said latched data selected by said selecting circuit,
wherein said write circuit writes said latched data output from said equalizer on said recording medium.

23. A recording method comprising:
receiving as input data generated synchronized with a predetermined clock signal;
detecting, for the input data, values of at least three bits of input data in a cycle defined by a period started from a desired position and corresponding to a cycle of said clock signal;
selecting from the input data with the detected values the input data with the least change of the value with respect to the input data of values detected immediately before and after substantially in each cycle; and
recording said selected input data on a recording medium.

24. A recording method as set forth in claim 23, wherein said step of selection of input data detects the longest period when the same value continues from the detected values of the input data and selects the input data of the approximate center in the period.

25. A recording method as set forth in claim 24, wherein said step of detection of the values of input data detects the values of the plurality of bits of input data in synchronization with the clock signal at every predetermined interval less than ½ of the cycle of the clock signal.

26. A recording method as set forth in claim 25, wherein
said step of detection of values of input data successively delays said input data to generate M (M is an integer of 4 or more) number of bits of delayed data and latches said M number of bits of delayed data in synchronization with said clock signal substantially simultaneously to detect the values of the M number of bits of said input data,
said step of selection of input data selects from the M number of the input data with values detected and successively delayed the input data of the approximate center of a range where the values are the same, and
said step of output of data outputs said latched data of said selected input data.

27. A data recording system, having a data processing apparatus and a plurality of recording apparatuses, wherein
said data processing apparatus comprises;
an oscillator for generating a clock signal,
a data processing circuit for generating the serial data synchronized with said clock signal, and
a transmitting circuit for transmitting said clock signal and said serial data, and
each of said recording apparatuses comprises;

an receiving circuit for receiving said clock signal and said serial data, a data detection circuit for detecting values of at least three bits of the serial data in a cycle defined by a period started from a desired position and corresponding to a cycle of said clock signal, a selecting circuit for selecting from the serial data with the detected values the serial data with the least change of the value with respect to the serial data of values detected immediately before and after substantially in each cycle, and a write circuit for writing said selected serial data on a recording medium.

* * * * *